US005711790A

United States Patent [19]
Coller

[11] Patent Number: 5,711,790
[45] Date of Patent: Jan. 27, 1998

[54] MARKING COMPOSITION

[76] Inventor: Miriam Coller, 84-05 Avon St., Jamaica, N.Y. 11432

[21] Appl. No.: 624,838

[22] Filed: Mar. 22, 1996

Related U.S. Application Data

[63] Continuation of Ser. No. 534,072, Sep. 26, 1995, abandoned, which is a continuation-in-part of Ser. No. 311,547, Sep. 23, 1994, abandoned.

[51] Int. Cl.$^6$ .................................................... C09D 11/00
[52] U.S. Cl. ...................................... 106/31.01; 106/31.94
[58] Field of Search ................................ 106/19 R, 19 C, 106/31.01, 31.94

[56] References Cited

U.S. PATENT DOCUMENTS

| | | | |
|---|---|---|---|
| 2,416,103 | 2/1947 | Lampton et al. | 244/134 |
| 2,716,615 | 8/1955 | Voris | 106/189 |
| 2,731,353 | 1/1956 | Fain et al. | 106/13 |
| 2,783,209 | 2/1957 | Pessel | 252/301.3 |
| 3,048,464 | 8/1962 | Fisher | 8/79 |
| 3,068,111 | 12/1962 | Seymour | 106/177 |
| 3,093,603 | 6/1963 | Gilchrist | 260/17 |
| 3,170,438 | 2/1965 | Nadler et al. | 106/124 |
| 3,263,012 | 7/1966 | Nadler et al. | 264/234 |
| 3,288,618 | 11/1966 | De Vries | 106/148 |
| 3,297,585 | 1/1967 | Hayden | 252/408 |
| 3,300,325 | 1/1967 | Lindquist | 106/195 |
| 3,496,906 | 2/1970 | Gerke | 116/124 |
| 3,652,313 | 3/1972 | Nagata et al. | 106/500 |
| 3,854,958 | 12/1974 | Sarnacke et al. | 106/14 |
| 3,899,439 | 8/1975 | Mahlman | 252/311 |
| 4,056,402 | 11/1977 | Guzi, Jr. | 106/500 |
| 4,364,994 | 12/1982 | Fogelberg | 428/316.6 |
| 4,792,357 | 12/1988 | Bier | 106/83 |
| 5,165,966 | 11/1992 | Adams | 427/256 |
| 5,397,387 | 3/1995 | Deng et al. | 106/19 C |

*Primary Examiner*—Helene Klemanski
*Attorney, Agent, or Firm*—Stephen E. Feldman

[57] ABSTRACT

Temporary marking compositions for producing colors upon contact with a surface, especially one covered in snow or ice, are disclosed. The compositions contain water-soluble salts or a mixture of water-soluble salts, colorant and water. The compositions may include a stabilizer, an extender, additional antifreezes, anti-bacterial/anti-fungus agents and other ingredients. The compositions may contain only antifreezes such as alcohol, glycerol and propylene glycol or combinations of the salts and/or other antifreezes. The methods of marking are disclosed.

13 Claims, No Drawings

MARKING COMPOSITION

This application is a continuation of Ser. No. 08/534,072 filed Sep. 26, 1995 now abandoned, which is a continuation-in-part of Ser. No. 08/311,547 filed Sep. 23, 1994, now abandoned.

FIELD OF THE INVENTION

The invention relates to compositions for producing temporary washable colored markings on surfaces, especially outdoors in subfreezing temperatures and for marking snow or ice.

BACKGROUND OF THE INVENTION

A number of marking compositions are used for various purposes.

U.S. Pat. No. 3,288,618 (DeVries) relates to a colored reflective coating composition.

U.S. Pat. No. 2,371,353 (Fain) relates to a de-icing composition applied as coating to aircraft parts. The composition is formed of lithium chloride combined with potassium chromate, carboxymethyl cellulose and a wetting agent. The wetting agent can be Triton X-100 which is an alkylated aryl polyether alcohol such as iso-octylphenyl ether of polyethylene glycol.

U.S. Pat. No. 2,416,103 (Lampton et al.) discloses a de-icing paint or coating which is applied to aircraft parts or accessories such as propellers, rotors, wings, etc. The composition comprises a resin, a wetting agent, a freezing point depressing material. A wetting agent is selected from the group consisting of salts of sulfated alcohols and salts of sulphated acids, salts of sulphated fatty acid amides, salts of sulphated fatty acids esters. The freezing depressant may be barium thiocyanate or other salts such as sodium chloride and calcium chloride.

U.S. Pat. No. 2,783,209 (Pessel) relates to a marine marking composition comprising a glue and light colored finely divided solid material such as polyalkylene glycol, methyl cellulose, polyvinyl alcohol.

U.S. Pat. No. 3,297,585 (Hayden) discloses a visual indicator comprising aqueous solution of a fluorescent and an alcohol soluble basic dye dissolved in a mixture of glacial acetic acid, ethanol, glycerine and propionic acid.

Most known marker composition include flammable and/or toxic and/or environmentally suspect chemicals. Therefore, these compositions present certain dangers. Because the Environmental Protection Agency restricts the use of toxic chemicals in coating compositions a number of water based paints have been created to replace the flammable and/or toxic coating compositions.

For example, U.S. Pat. No. 4,792,357 (Bier) discloses a water-based paint comprising water-soluble salts in concentration of at or above 10% (weight/volume) and a pigment in the amount of at least 5% by weight. A filler is present in the paint composition in the amount of from about 20% to about 70% by weight. This paint is used only for interior painting of buildings, especially ceilings. The composition can not be used for marking the ground. The formulation includes a considerable amount of talc as a filler and a water soluble salt. The talc is used to create a thick, smooth mixture which spreads evenly, covers the substrate in one or two coats and dries to a permanent, washable covering.

U.S. Pat. No. 5,165,966 (Adams) relates to a process of painting snow with a biodegradable solution of a food coloring and a gelling agent such as household gelatin. However, the paint lies only on the top of the snow. Warm water is required to mix with dry ingredients. The paint contains no antifreeze. It is not clear how long it will disperse if left in the cold.

OBJECTS OF THE INVENTION

It is an object of the invention to provide compositions which are non-toxic and environmentally acceptable for coating of snow or ice and other surfaces such as for trail marking, sports field marking, hazard marking and for decorating outdoor surfaces, particularly snow and ice.

It is another object of the invention to create a water-based temporary coloring solution which can be utilized and kept outdoors indefinitely at low temperatures.

It is a further object of the invention to develop a product that provides a quality marking and excludes or limits the "bleeding" effect of a colorant on snow, ice and surfaces such as sand.

It is still another object of the invention to provide a covering composition which can be washed off surfaces by rain and will disappear with snow and ice as they melt.

It is also another object of the invention to create a composition which washes from most fabrics.

It is yet further object of the invention to lower the cost of a marking composition.

SUMMARY OF THE INVENTION

The invention relates to marking compositions. The compositions are mixtures of ingredients including at least water, an anti-freeze agent and water soluble colors. The compositions may include a stabilizer such as hydroxypropyl cellulose and/or an extender such as talc. The stabilizer produces an even coating of color. It may also be necessary to add a stabilizer when two colorants are combined together to improve color quality. The extender controls the melting effect of the anti-freeze and thereby the bleeding of the colorant on snow or ice.

The markings on the ground will be washed away with melting snow or falling rain. The ingredients can be dissolved in water. The composition may include specific agents such as additional antifreezes, antibacterial/fungus agents, such as sodium or benzoate additional stabilizers and additional extenders such as chalk or clay for controlling the quality of the marking and the melting effect of the anti-freeze. A chalk also enlightens the color.

A marking composition comprises:

(a) A salt selected from the group comprising sodium chloride, magnesium chloride and calcium chloride and taken in the amounts from about 1% to about 25%. Combinations of the above salts may also be used and their amounts can vary.

(b) Cellulose such as hydroxypropyl cellulose (HPC) in the amount up to about 0.5%. The cellulose acts as a stabilizer.

(c) Talc in the amount up to about 2%, acts as an extender.

(d) Colors in the amount from about 0.01% to about 2%.

(e) Water in the amount that adds to 100%.

The marking compositions may comprise the ingredients (a), (d) and (e) only.

DETAILED DESCRIPTION OF THE INVENTION

The marking compositions of the invention are prepared by dissolving water soluble salts such as sodium chloride, magnesium chloride and calcium chloride in water. A solution with 21% by weight of sodium chloride is necessary to lower the temperature to 0° Fahrenheit. A sealed 8 oz. container of this composition does not require toxicity labelling under ASTM-D4236 standards, is nonflammable and is soluble. If magnesium chloride is taken in the amount of about 21% by weight the composition can be used at minus 23° Fahrenheit. Calcium chloride in the amount of 25% by weight reduces the temperature of the solution to −20° Fahrenheit.

Each of the salts can be combined with each of the others or with other antifreezes such as alcohol. For example, 10% magnesium chloride and 15% sodium chloride or 10% calcium chloride and 23% sodium chloride will each reduce the temperature of the solution to −20° Fahrenheit.

A solution of a salt in water and color may be used when the quality of marking is not at issue. A stabilizer and/or an extender can be added to improve the quality of the marking. A preferred stabilizer is hydroxypropyl cellulose (HPC). The HPC acts as a thickening agent and assists in creating uniform color and in holding color combinations together. A preferred extender is talc. Talc minimizes the "spreading" or bleeding effect that occurs when combinations of a salt, such as sodium chloride, and colorant are used. When HPC is used in the amount of above about 0.5% an adverse effect on the solution is observed. The stabilizer can be removed in applications where the coloring quality is irrelevant and where no color combinations, e.g., red and blue to make purple, are necessary.

The extender selected from the group consisting of talc, chalk and clay acts to impede the effects of penetrating and spreading of the solution into snow or ice when a salt is used as antifreeze. For decorative and precise marking, especially on snow, it is necessary to prevent undue bleeding on snow surfaces or excessive penetration of color into the snow. For other applications talc or other extenders can be excluded from the compositions. The colors may be used alone or in combination with other colors.

Several colors have been developed using colorants chosen from the FD&C color list primarily for use with a solution comprising a salt (particularly NaCl) as the principal antifreeze. Red and yellow colors are used to make orange. A blue and a red color are used to create purple. A basic color is: red-FD&C Red #3, or Cochineal Red, or combinations thereof-50% of each of the two colors or 60% Red #3 and 40% Cochineal. The Red #3 is preferable since the cochineal is quite costly. FD&C Red #40 is not usable with more than about 10% sodium chloride to make red color. NaCl, $MgCl_2$, and $CaCl_2$ cause FD&C Red #40 to become brown. It browns even more in freezing conditions. The other basic colors are blue-FD&C Blue #1; yellow-Yellow #5 and/or #6; green-a mixture of Yellow #5 and Green #3. Orange is made with a mixture of Yellow #5 and Red #3. Purple is a mixture of Red #3 and Blue #1. Other colors from the FD&C list can be used as well as mixtures of colors. Pastels can be created by reducing the concentration of color. Fluorescence can also be created. For example, FD&C Red #3 contains fluorescent components. The choices and concentrations of colors may be adjusted to meet ASTM-D4236 Standards for no toxicity warnings. Colorants other than FD8C colors may be used.

Antifreezes such as alcohol, glycerine or propylene glycol can be used with or in place of the salts. An alcohol such as ethanol used in the amount of from about 23% to about 40% by weight will lower the temperature of the solution to 0° Fahrenheit or −20° Fahrenheit respectively. A solution of 47% by weight of propylene glycol allows one to achieve −20° Fahrenheit. These other antifreezes may also be used in lesser amounts when combined with sodium chloride, calcium chloride or magnesium chloride. The antifreezes have an ability to lower the freezing point of the solution well below minus 6 Fahrenheit, the lower limit for sodium chloride. For example, a combination of 20% glycerol and 20% sodium chloride in the solution reduces the freezing point to −10 Fahrenheit.

The non-salt antifreeze solutions allow the FD&C Red #40 to retain its red color. Because these antifreezes do not have the same melting effect as the salts it is also possible to eliminate the extender.

EXAMPLE 1

Marking compositions were prepared from the following ingredients.

| Ingredient | Product 1 % by weight | Product 2 % by weight | Product 3 % by weight |
| --- | --- | --- | --- |
| $MgCl_2$ | 0% | 0% | 20% |
| NaCl | 20% | 16% | 0% |
| $CaCl_2$ | 0% | 2.8% | 0% |
| Color | .25%–3% | .5% | .5% |
| HPC | .5% | .5% | .5% |
| Talc | .5% | .5% | .5% |
| Water | Balance to 100% | Balance to 100% | Balance to 100% |

The dry ingredients were mixed with water at room temperature. The product may be produced as a liquid. It may also be produced as a dry blend or as a concentrate with subsequent addition of water or other liquid.

EXAMPLE 2

The cost of the composition of an orange-red colorant based on the formulation of Product 3 was calculated for the manufacture of 20,000 pounds of the color composition as follows:

| Ingredient | $/lb | lb. RM* | Total RMC** |
| --- | --- | --- | --- |
| Water | .0015 | 15,700 | 23,55 |
| 20% $MgCl_2$ | .50 | 4,000 | 2.000.00 |
| .5% HPC | 6.40 | 100 | 640.00 |
| .5% Talc | .29 | 100 | 29.00 |
| .15% Red #3 | 31.40 | 50 | 1,570.00 |
| .15% Yellow #6 | 8.95 | 50 | 449.50 |
| | | 20,000 | 4,710.05 |

*RM = raw material
**RMC = raw material cost

From the foregoing, a cost per 8 fluid ounce container was calculated at $0.12.

EXAMPLE 3

A "kit" of four different colors was made using the following ingredients.

| Color | Percentages | Raw Material | #LBS Raw Material |
| --- | --- | --- | --- |
| | | Water | 157,425 |
| | 0.5% | HPC | 1,000 |
| | 0.5% | Talc | 1,000 |
| | 20.0% | NaCl | 40,000 |

-continued

| Color | Percentages | Raw Material | #LBS Raw Material |
| --- | --- | --- | --- |
| BLUE | 0.3% | FD&C Blue #1 | 150 |
| RED | 0.3% | FD&C Red #3 | 150 |
| GREEN | 0.21% | FD&C Yellow #5 | 105 |
|  | 0.09% | FD&C Green #3 | 45 |
| YELLOW | 0.235% | FD&C Yellow #5 | 110 |
|  | 0.035% | FD&C Yellow #6 | 15 |
|  |  |  | 200,000 |

EXAMPLE 4

The following products were prepared by mixing the ingredients listed below at room temperature:

Product No. 1

| Ingredient | Amount in Grams | Freezing Point |
| --- | --- | --- |
| Color | 3.0 |  |
| HPC | 5.0 |  |
| Talc | 5.0 | (0° F.) |
| NaCl | 210.0 |  |
| Water | 777.0 |  |
| Total | 1,000.0 |  |

Product No. 2

| Ingredient | Amount in Grams | Freezing Point |
| --- | --- | --- |
| Color | 3.0 |  |
| HPC | 5.0 |  |
| Talc | 5.0 | (+10.7° F.) |
| NaCl | 160.0 |  |
| Water | 827.0 |  |
| Total | 1,000.0 |  |

Product No. 3

| Ingredient | Amount in Grams | Freezing Point |
| --- | --- | --- |
| Color | 5.0 |  |
| HPC | 5.0 |  |
| Talc | 2.5 | (−10° F.) |
| NaCl | 200 |  |
| Glycerol | 200 |  |
| Water | 587.5 |  |
| Total | 1,000 |  |

Product No. 4

| Ingredient | Amount in Grams | Freezing Point |
| --- | --- | --- |
| Color | 5.0 |  |
| HPC | 5.0 |  |
| Talc | 2.5 | (−4° F.) |
| NaCl | 160 |  |
| Glycerol | 159 |  |
| Water | 677.5 |  |
| Total | 1,000 |  |

The product can be prepacked in spray containers, cans, jars and other containers. It can be prepared as a concentrate or powder and prepacked accordingly in drums or other large containers. The concentrate or powder, to be mixed with water by the user, would be appropriate for large quantity applications. For small quantity applications, packets of concentrate or dry mixture may also be appropriate. The prepared product may be utilized for decorative purposes and entertainment and for marking sports fields, particularly ski, sledding and skating ones. It can also be utilized for construction sites, "SOS"-signs for skiers, hikers and climbers, for designating temporary crosswalks, for marking airport runways, for marking hazards on snow or ice, for police work in the snow and similar uses. In particular, the NaCl solution is usable for indoor art and crafts projects and outdoor on deserts, beaches, sand and for other purposes.

It is understood that various changes and modifications can be made in the invention without departing from the scope of the invention as defined by the appended claims.

What is claimed is:

1. An aqueous marking composition comprising a water soluble salt or a mixture of water soluble salts in an amount of from about 1% to about 25% by weight selected from the group consisting of sodium chloride, magnesium chloride, and calcium chloride; and, water soluble colorants.

2. An aqueous marking composition as claimed in claim 1 further comprising hydroxypropyl cellulose as a stabilizer.

3. An aqueous marking composition as claimed in claim 1 further comprising an extender.

4. An aqueous marking composition as claimed in claim 3 wherein said extender is selected from the group consisting of talc, chalk and clay.

5. An aqueous snow marking composition comprising by weight sodium chloride taken in the amount from about 1% to about 23.3%, water soluble colorants taken in the amount from about 0.01% to about 2%, hydroxypropyl cellulose taken in the amount of up to about 0.5%, and talc taken in the amount of from about 0.25% to about 2%.

6. An aqueous marking composition as claimed in claim 1 or claim 5 further comprising an antifreeze selected from the group consisting of alcohol, glycerol and propylene glycol or mixtures thereof.

7. An aqueous marking composition as claimed in claim 6 further comprising anti-bacterial and anti-fungus agents.

8. An aqueous marking composition as claimed in claim 7 wherein said anti-bacterial and anti-fungus agent is sodium benzoate.

9. An aqueous marking composition as claimed in claim 1 or claim 5 further comprising chalk.

10. A marking composition comprising an antifreeze selected from the group consisting of alcohol, glycerol and propylene glycol or mixtures thereof, water-soluble colorant, a hydroxy propylcellulose stabilizer, and an extender.

11. A method of marking comprising the steps of a) selecting a snow or ice surface for marking;

b) applying an aqueous marking composition comprising a water soluble salt in an amount of from about 1% to about 25% by weight selected from the group consisting of sodium chloride, calcium chloride and magnesium chloride, water soluble colorants, an extender in an amount of up to about 2% by weight and hydroxypropyl cellulose in an amount of up to about 0.5% by weight.

12. A method of marking comprising the steps of
a) selecting a snow or ice surface for marking;
b) applying a marking composition comprising an antifreeze in an amount of from about 23% to about 47% by weight selected from the group consisting of alcohol, glycerol end propylene glycol, water soluble colorants, an extender in an amount of up to about 2% by weight and hydroxypropyl cellulose in an amount of up to about 0.5% by weight.

13. A method of marking as claimed in claim 11 or 12 wherein the marking composition is sprayed on the surface.

* * * * *